No. 654,970. Patented July 31, 1900.
A. S. GOOCH.
COMPRESSING AND BALING APPARATUS.
(Application filed May 8, 1900.)
(No Model.) 3 Sheets—Sheet 2.
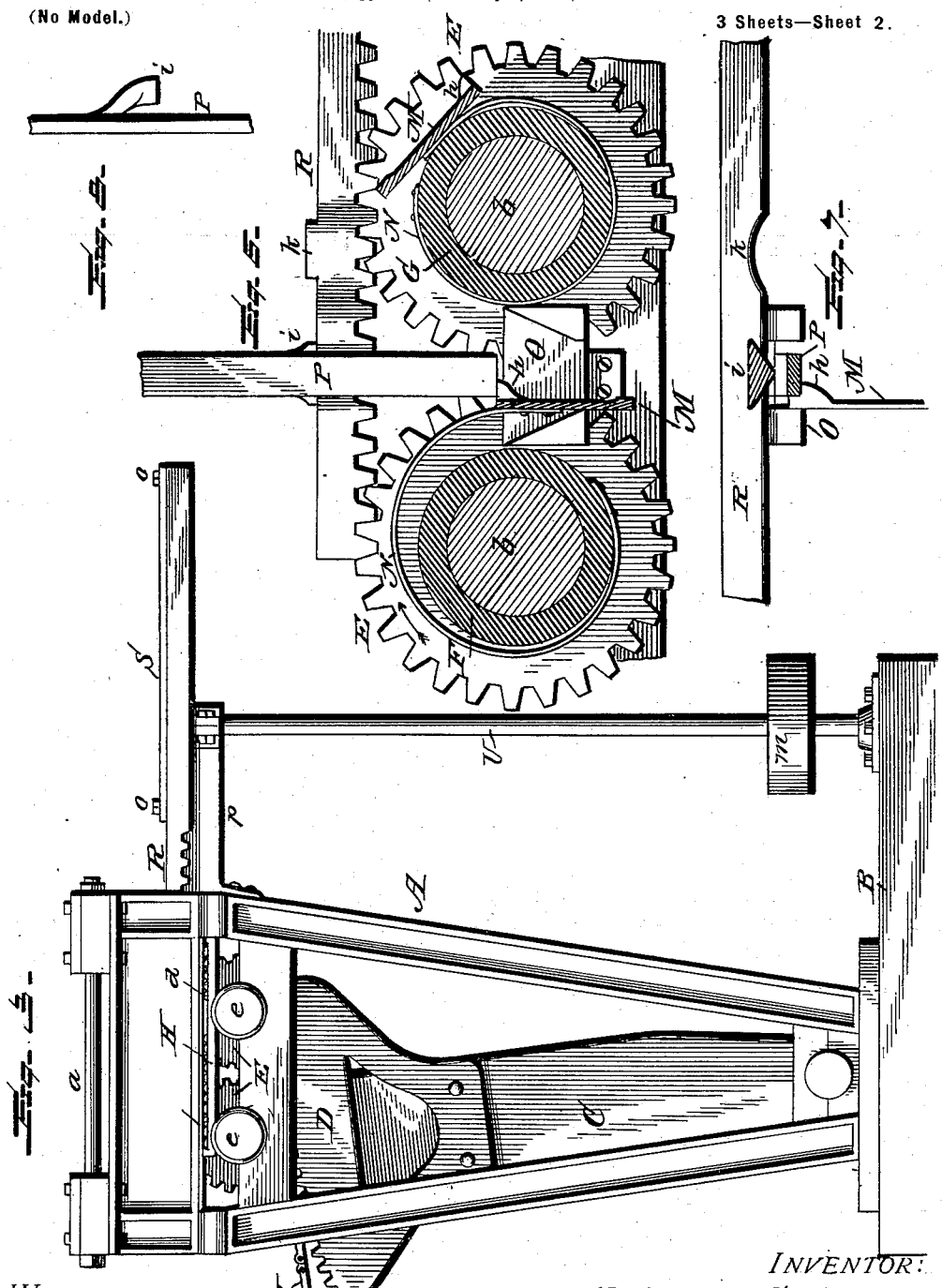
WITNESSES:
INVENTOR:
Alphonso S. Gooch,
BY Chas. H. Fowler
Attorney No. 654,970. Patented July 31, 1900.
A. S. GOOCH.
COMPRESSING AND BALING APPARATUS.
(Application filed May 8, 1900.)
(No Model.) 3 Sheets—Sheet 3.
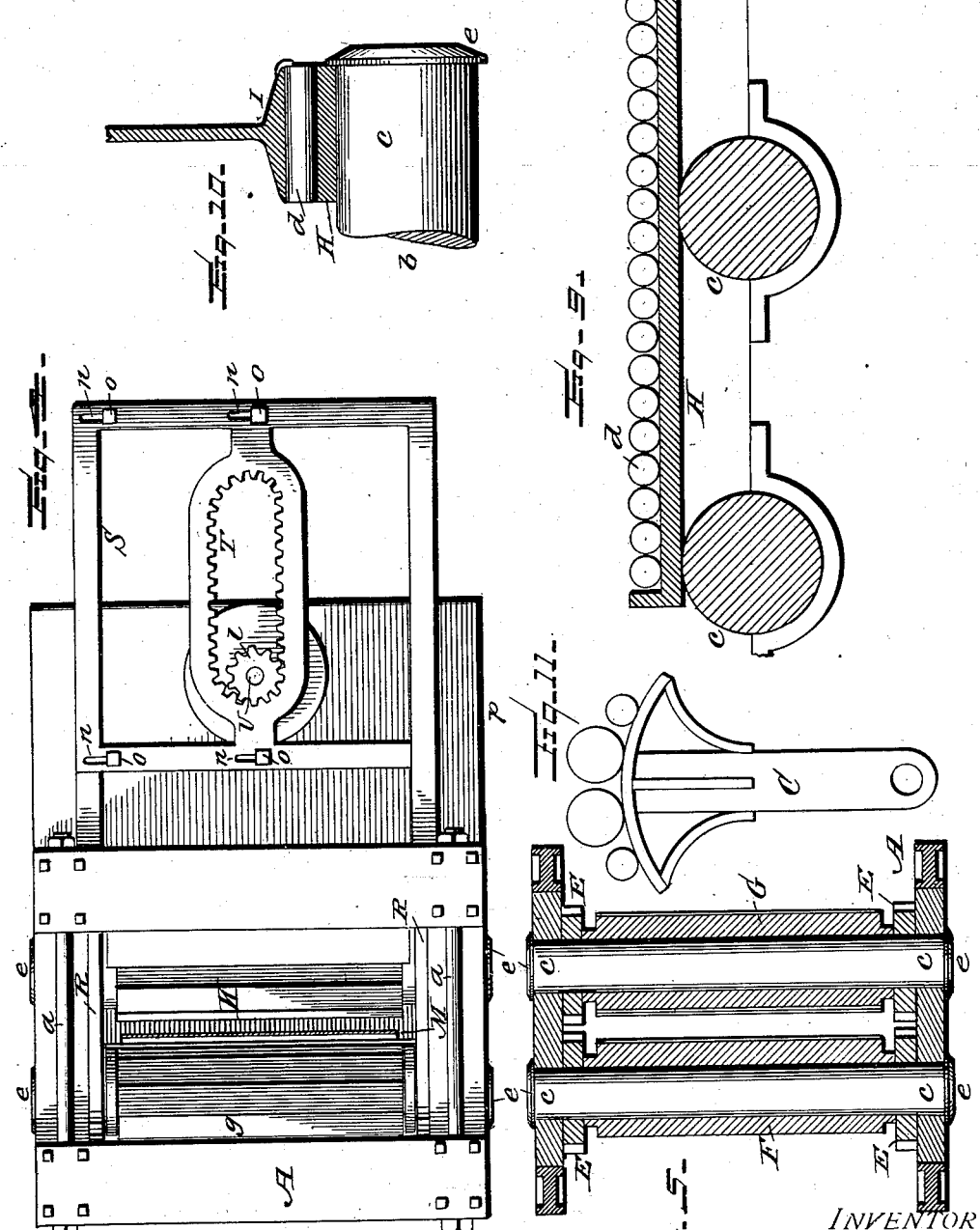
WITNESSES:
L. C. Hills.
D. P. Cowl
INVENTOR
Alphonso S. Gooch,
BY Chas. H. Fowler.
Attorney

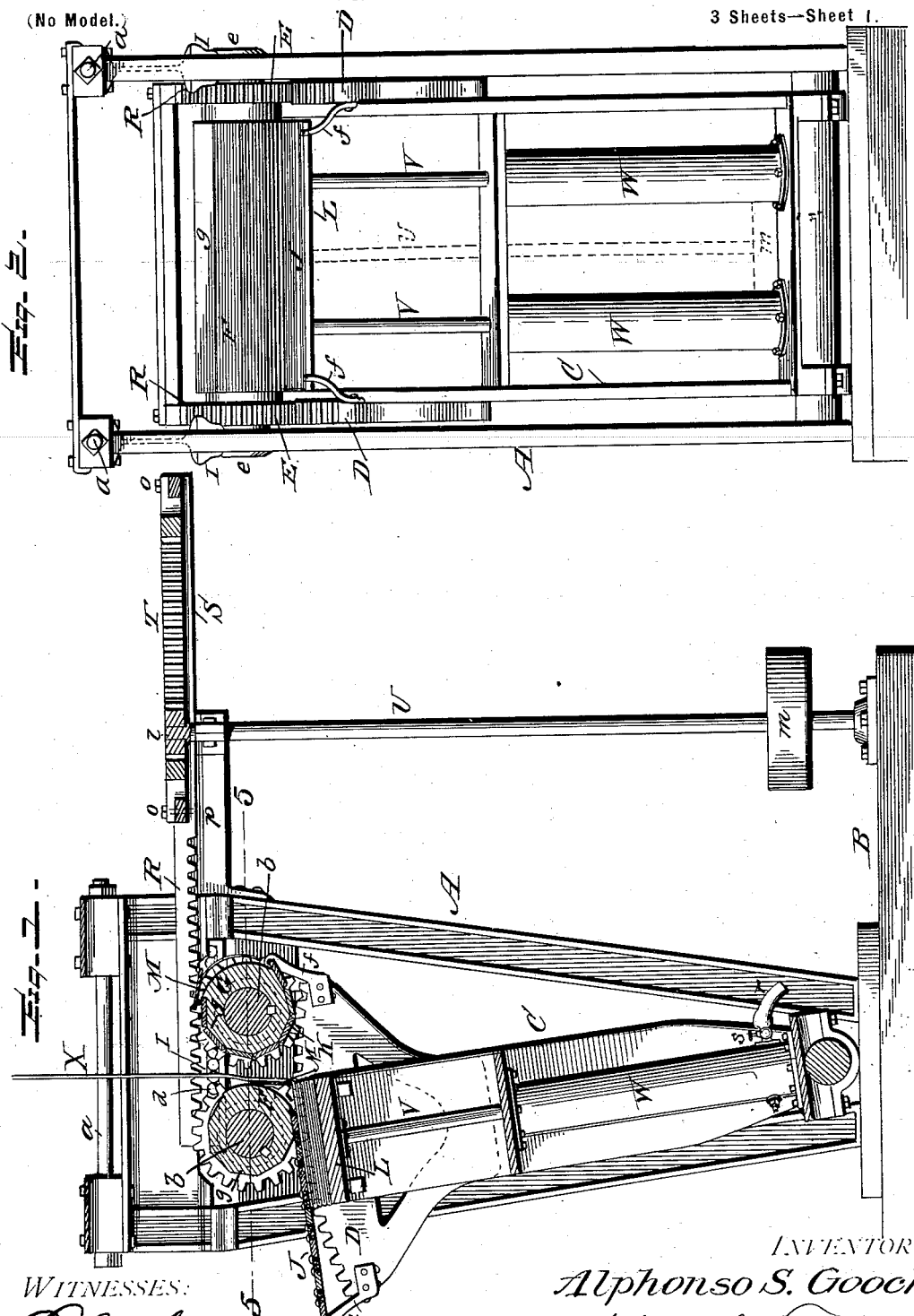

UNITED STATES PATENT OFFICE.

ALPHONSO S. GOOCH, OF LITTLE ROCK, ARKANSAS.

COMPRESSING AND BALING APPARATUS.

SPECIFICATION forming part of Letters Patent No. 654,970, dated July 31, 1900.

Application filed May 8, 1900. Serial No. 15,927. (No model.)

*To all whom it may concern:*

Be it known that I, ALPHONSO S. GOOCH, a citizen of the United States, residing at Little Rock, in the county of Pulaski and State of Arkansas, have invented certain new and useful Improvements in Compressing and Baling Apparatus; and I do hereby declare that the following is a full, clear, and exact description of the same, reference being had to the annexed drawings, making a part of this specification, and to the letters of reference marked thereon.

The present invention has relation to compressing and baling apparatus in which the cotton or other material is delivered to the compressing-rollers and from the rollers into a bale chamber or box in which the bale is formed into shape, and has reference more particularly to that class in which an oscillating carrier or bale-box is employed and a flexible connection between the bale-box and compressing-rollers, whereby the flexible connections are alternately coiled over the compressing-rollers in the operation of compressing or baling the cotton or other material.

It is the purpose of the invention to materially improve the above class of compressing and baling apparatus, whereby a more perfect action and operation of the parts are attained, the compressing and baling of the cotton, hay, straw, or other material facilitated and rendered more simple, as well as securing increased strength and durability in the general construction of the machine or apparatus.

The invention therefore consists in a compressing and baling apparatus constructed substantially as shown in the drawings and hereinafter described and claimed.

Figure 1 of the drawings is a central sectional elevation of a compressing and baling apparatus constructed in accordance with my invention, the rack-driving shaft and pulley being shown in elevation; Fig. 2, an end view thereof, showing the rack-driving shaft and pulley in dotted lines; Fig. 3, a side elevation with the several movable parts in the same position shown in Fig. 1; Fig. 4, a top plan view of Fig. 3; Fig. 5, a horizontal section taken on line 5 5 of Fig. 1, showing the shafts of the compressing-rollers in elevation; Fig. 6, a detail view, on an enlarged scale, showing the compressing rollers and shafts in section and the folder-plates connected with the rollers by suitable springs, the toothed wheels on the ends of the rollers, the rack-bar and its connections being shown in elevation; Fig. 7, a detail horizontal view of one of the rack-bars, the trip device, and its connections; Fig. 8, a detail edge view of the bar, with trip device thereon; Fig. 9, a detail view, on an enlarged scale, showing the ends of the compressing-rollers in section, also the tray for holding the antifriction-rollers resting thereon, the rollers being shown in elevation on the tray; Fig. 10, a detail end view of one of the shafts of the compressing-roller, a transverse section of the tray resting thereon, with the antifriction-roller in position on the tray and the track for the rollers located above the same, said track being shown in cross-section; Fig. 11, a detail view showing a modification of the means employed for holding the material down upon the platen, rollers being substituted for the aprons.

In the accompanying drawings, A represents a metal frame of any suitable form and construction, which is supported on a floor or base B, said frame at its top having the horizontal brace-rods a, and at the bottom or lower end of the frame is connected a suitable oscillating carrier C, which may be of any desirable form and construction and connected to the frame in any well-known and suitable manner that will admit of the carrier oscillating back and forth on an arc of a circle when the necessary power is applied thereto. This carrier C is provided with segmental racks D, which mesh with toothed wheels E upon the ends of two compressing-rollers F G, the toothed wheels imparting motion to the racks. These rollers are keyed to shafts projecting out beyond the ends of the rollers and having their bearings in the sides of the frame A, as shown in Fig. 5 of the drawings. These shafts, as represented at b, have flanged ends c, upon which rest the trays H for supporting the antifriction-rollers d, said trays extending transversely of the shafts and the rollers bearing against a track I, suspended over the rollers, as shown in Figs. 9 and 10 of the drawings. The trays H are retained on the ends of the shafts by the flanges e, the rollers on the trays assisting in a more perfect and easy operation of the parts, with less tendency to bind, and presenting less resistance to the rack-bars.

Slatted or any suitable aprons of any preferred construction, as shown at J K, are connected at one of their ends to the periphery of the compressing and fold-laying rollers and at their opposite ends to brackets $f$, projecting from the segmental racks D, as shown in Fig. 1 of the drawings. A portion of the periphery of the compressing and fold-laying rollers F G has a flat surface, as shown at $g$, to form seats for the slatted aprons J K to rest upon when wound around the rollers, so that the outer surface of the apron when thus wound around the rollers will not project beyond the greatest diameter thereof, and thereby describe a complete circle and insure a successful operation of the rollers in their compressing action. The slatted or other suitable aprons are alternately wound around their respective compressing and fold-laying rollers, as shown in Fig. 1 of the drawings.

When the apparatus is used for compressing and baling cotton, the sheet or bat thereof, as indicated at X in Fig. 1 of the drawings, is fed to the platen L in layers, the slatted apron holding the layers down thereon until the next layer is formed by the opposite compressing and fold-laying roller, this alternate action of the rollers and slatted aprons upon the cotton-bat forming a succession of layers until a sufficient number is secured to form the required-size bale.

In baling cotton or like material that is required to be inclosed in bagging the bottom bagging is first placed on the platen, and when the bale is of the desired size the apparatus is stopped by the means usually employed for this purpose and the top bagging, with ties attached, and the platen lowered a sufficient distance to complete tying and removal of bale.

Each of the rollers F G is provided with a spring-actuated folder-plate M, connected with the roller by a coiled spring or springs N, as shown more clearly in Fig. 6 of the drawings. These spring-actuated folder-plates are for the purpose of engaging the material to be baled on the inside thereof or the side next to the compressing or fold-laying roller, as shown in Fig. 1 of the drawings. As the material nears the end of its travel to complete the fold the spring-actuated folder-plate will force the material a little way from the roller and hold it down until the motion of the roller is reversed, thereby insuring an even fold of material.

In order to bring the spring-actuated folder-plate in position to act on the material, there is provided what I term a "double-inclined" spreader-block O. (Shown in Fig. 6 of the drawings.) As the compressing and fold-laying roller is rotated in the direction of the arrow in Fig. 6 of the drawings the free end of folder-plate M will come in contact with the inclined side of the spreader-block O and will ride down the incline and be forced out laterally, as shown, with the lug $h$ under the lower end of the pivoted hanger P. In this position the spring-mounted folder-plate M is held a short time or sufficient to act on the material being folded. When the lower end of the hanger P is removed from contact with the lug $h$, the plate will resume its normal position, as shown, on the compressing fold-laying roller G.

Any suitable means may be provided for releasing the end of the hanger P from contact with the lug $h$, such as a trip $i$ upon the hanger, against which acts the shoulder $k$, which forces it out laterally from contact with the lug. This hanger and the trip $i$, in connection with the shoulder $k$ on the rack-bar R, I shall term a "releasing" device, and any device that will serve to release the spring-mounted folder-plate M at the proper time, so that the same can resume its normal position on the roller, may be substituted for the means shown, that shown being only one of many means that could be successfully employed as a holding and releasing device.

The rack-bars R are adapted to engage with the toothed wheels E upon the ends of the rollers F G, by which said rollers are given their motion. These rack-bars R project from a horizontal frame S, which carries a double rack or internally-toothed gear T, with which engages a pinion $l$ upon the upper end of the shaft U, which is provided with a belt-pulley $m$.

The above-described mechanism is for the purpose of operating the compressing and fold-laying rollers F G and also to reverse the motion of the shaft U to turn the rollers in an opposite direction. The reversing of the motion is accomplished by the laterally-movable frame S, and to secure this result the frame has elongated slots $n$, through which extend guide-bolts $o$, the frame being shifted laterally as the pinion changes from one side of the internal gear to the other, thereby reversing the motion required to turn the rollers in an opposite direction.

Any suitable and well-known means may be employed for reversing the motion of the rack-bars R as found best adapted to the purpose and any changes or modifications in the several details of construction as would come within ordinary mechanical skill may be resorted to without departing from the principle of the invention. The movable platen L may be successfully operated by hydraulic or any other power found most preferable.

I have shown in the drawings a hydraulic lift or jack consisting of the two cylinders W with the usual pistons V, which connect at their upper ends with the platen L, by which said platen is moved back and forth in the carrier C, or, if desired, steam may be substituted for water, the supply to the cylinder passing through the pipe $r$, controlled by a cock $s$.

It is evident that the carrier C may be in the form of a press-box or receptacle of the ordinary construction, and to form a support for the laterally-shifting frame S there is provided a table $p$, which extends out horizontally at a suitable distance, as shown in Figs. 1, 3, and 4 of the drawings.

Although I have shown an internally-toothed gear and a pinion engaging therewith as a means for shifting the frame S to change the motion of the shaft U, any well-known means may be substituted that will accomplish the purpose desired.

The aprons used are shown as slatted aprons; but any form or construction of apron may be substituted therefor, as found most desirable, as I do not wish to be understood as confining myself to any particular form of apron.

In place of the aprons I may use a plurality of rollers, as shown in Fig. 11 of the drawings, to compress and hold the folds down upon the platen, as I do not wish to be understood as limiting my invention to any special means for accomplishing this purpose.

In the operation of compressing and baling the cotton the sheet or bat, as indicated at X, is fed between the rollers F G, and as motion is imparted to the upright shaft U through the medium of belt and pulley the pinion $l$ upon the upper end thereof rotates with the shaft. The teeth of this pinion $l$ mesh with the teeth of the continuous and internal gear T, which will cause the frame S, to which the gear is connected, to be moved lengthwise, giving to said frame a continuous reciprocating motion. The form of gear as shown at F is of the ordinary construction and what is usually termed a "double" rack, with a continuous-toothed gear, and by the rotatable pinion $l$ engaging the teeth upon one side of the rack and thence upon the other side will impart to the frame S a continuous movement back and forth. As the frame S is thus reciprocated or moved back and forth the rack-bars R, engaging the toothed wheels E of the rollers F G, will cause said rollers to rotate. The toothed wheel E, engaging the segmental racks D upon the upper ends of the carrier D, will impart to the carrier an oscillating motion through the medium of the reciprocating motion of the rack-bars. In the position shown in Fig. 1 of the drawings the platen L is directly under the roller F and has completed its layer of cotton sheet or bat, and in this position the spring-mounted folder-plate M is in contact with the material at the juncture of the fold. As the carrier C passes back under the roller G the roller F in its backward movement will carry with it the folder-plate M and release it from contact with the block O and the lower end of the hanger P. It should be understood at this point the hanger P, which may be suspended from any object, has been moved laterally or at a right angle to the length of the rack-bars R sufficient to bring the lower end of the hanger out of line with the lug $h$ and from contact therewith. This shifting of the hanger P is obtained through the medium of the shoulder $h$ upon the reciprocating rack-bar R coming in contact with the trip $i$ as the rack-bar moves forward. The roller F, with its connecting parts, will now assume the same position as that of the roller G in Fig. 1 of the drawings, and the roller G will assume the position of roller F. As the platen L passes under the roller G the folder-plate M, coming in contact with the layer of cotton-bat, will form the apex of the fold, and the folder-plate M of the roller G, as it is brought in contact with the inclined side of the block O, will be moved out in position to bring the lug $h$ directly under the lower end of the hanger P to hold the plate stationary for action on the cotton-bat. This action of the rollers F G and the spring-mounted folder-plates M is repeated until the desired number of layers of cotton-bat are formed to produce the bale, the slatted aprons holding the material down upon the platen as the layers are being formed.

Having now fully described my invention, what I claim as new, and desire to secure by Letters Patent, is—

1. A compressing and baling apparatus, consisting of an oscillating carrier having toothed segments, a movable and mechanically-resisted platen or follower-block connecting with the carrier, compressing and fold-laying rollers having toothed wheels to engage with the toothed segments of the carrier, and reciprocating rack-bars engaging the toothed wheels of the rollers, substantially as and for the purpose set forth.

2. A compressing and baling apparatus, consisting of a suitable frame, an oscillating carrier having a movable and mechanically-resisted platen or follower-block, toothed segments on the carrier, compressing and fold-laying rollers provided with toothed wheels to engage the toothed segments, reciprocating rack-bars for operating the rollers and a suitable apron connecting the carrier with the rollers, substantially as and for the purpose described.

3. A compressing and baling apparatus, consisting of a suitable frame, an oscillating carrier having a movable and mechanically-resisted platen or follower-block, compressing and fold-laying rollers, suitable aprons connecting the carrier with said rollers, and spring-mounted folder-plates connected with the rollers, substantially as and for the purpose specified.

4. In a compressing and baling apparatus, suitable compressing and fold-laying rollers and spring-mounted folder-plates connected to and moving therewith, substantially as and for the purpose set forth.

5. In a compressing and baling apparatus, suitable compressing and fold-laying rollers, suitable spring-mounted folder-plates connected to and moving with the rollers, and a holding and releasing mechanism for the plates, substantially as and for the purpose described.

6. A compressing and baling apparatus, consisting of a suitable frame, an oscillating carrier having a movable and mechanically-resisted platen, means for operating the platen or follower-block, compressing and fold-laying rollers, suitable aprons connecting the rollers with the carrier, spring-mounted folder-plates connected to and moving with the rollers, and a holding and releasing mechanism therefor, substantially as and for the purpose specified.

7. A compressing and baling apparatus, comprising a suitable frame, an oscillating carrier having a movable and mechanically-resisted platen, compressing and fold-laying rollers, suitable aprons connecting the rollers with the carrier, folder-plates having lugs at their inner ends, suitable springs connecting the plates with the rollers, and a holding and releasing device for the plates, substantially as and for the purpose set forth.

8. A compressing and baling apparatus, consisting of a suitable frame, an oscillating carrier provided with a movable and mechanically-resisted platen or follower-block, compressing and fold-laying rollers, suitable aprons connecting the rollers with the carrier, spring-mounted folder-plates connected to and moving with the rollers, and a double-inclined spreader-block to operate the plates; substantially as and for the purpose specified.

9. In a compressing and baling apparatus, an oscillating carrier having a movable and mechanically-resisted platen or follower-block, toothed segments upon the carrier, compressing and fold-laying rollers having toothed wheels to engage the toothed segments, and means for operating the rollers, consisting of horizontally-movable rack-bars engaging the toothed wheels, substantially as and for the purpose set forth.

In testimony that I claim the above I have hereunto subscribed my name in the presence of two witnesses.

ALPHONSO S. GOOCH.

Witnesses:
C. F. WALTHER,
L. L. WALTHER.